(12) United States Patent  (10) Patent No.: US 8,133,142 B2
Gerlich et al.  (45) Date of Patent: Mar. 13, 2012

(54) BELT PULLEY FOR THE OUTPUT SHAFT OF A GEAR, GEAR, ELECTRIC MOTOR, AND OUTPUT SHAFT

(75) Inventors: Knut Gerlich, Bad Dürrheim (DE); Andrej Schneider, Bonndorf (DE); Gerhard Tascher, Schluchsee (DE); Klaus Pfendler, Bonndorf (DE)

(73) Assignee: Dunkermotoren GmbH, Bonndorf, Schwarzwald (DE)

( * ) Notice: Subject to any disclaimer, the term of this patent is extended or adjusted under 35 U.S.C. 154(b) by 0 days.

(21) Appl. No.: 12/116,595

(22) Filed: May 7, 2008

(65) Prior Publication Data

US 2008/0280714 A1  Nov. 13, 2008

(30) Foreign Application Priority Data

May 8, 2007  (EP) .................................... 07301020

(51) Int. Cl.
*F16H 7/00*  (2006.01)
*F16H 55/36*  (2006.01)
(52) U.S. Cl. ..................... 474/153; 474/166; 474/903
(58) Field of Classification Search .................. 474/903, 474/166, 152
See application file for complete search history.

(56) References Cited

U.S. PATENT DOCUMENTS

| | | | | |
|---|---|---|---|---|
| 2,625,415 A | * | 1/1953 | Smith | 403/289 |
| 3,531,144 A | * | 9/1970 | Bizilia | 403/326 |
| 3,608,936 A | * | 9/1971 | Karden | 403/9 |
| 4,124,318 A | * | 11/1978 | Sagady | 403/14 |
| 4,226,454 A | * | 10/1980 | Tranberg et al. | 292/336.5 |
| 4,576,505 A | * | 3/1986 | Wrightson et al. | 403/362 |
| 4,676,089 A | * | 6/1987 | Nevin | 72/355.4 |
| 4,736,602 A | * | 4/1988 | Denzler et al. | 66/210 |
| 4,813,808 A | * | 3/1989 | Gehrke | 403/326 |
| 5,052,842 A | | 10/1991 | Janatka | |
| 5,275,577 A | * | 1/1994 | Hildebrandt et al. | 474/174 |
| 5,370,587 A | * | 12/1994 | Johnson et al. | 474/166 |
| 5,693,142 A | * | 12/1997 | Pedigrew et al. | 118/261 |
| 5,807,180 A | * | 9/1998 | Knodle et al. | 464/139 |
| 6,582,333 B2 | * | 6/2003 | Man et al. | 475/5 |
| 6,913,540 B2 | * | 7/2005 | Iihara et al. | 464/144 |
| 7,198,425 B2 | * | 4/2007 | Bergkvist et al. | 403/359.5 |
| 2002/0179305 A1 | | 12/2002 | Mack | |
| 2003/0055432 A1 | * | 3/2003 | Steiger | 606/80 |

FOREIGN PATENT DOCUMENTS

| | | |
|---|---|---|
| AU | 481202 | 1/1976 |
| CH | 159479 | 1/1993 |
| GB | 1264078 | 2/1972 |
| WO | 0047908 | 8/2000 |

* cited by examiner

*Primary Examiner* — Michael Mansen
*Assistant Examiner* — Henry Liu
(74) *Attorney, Agent, or Firm* — Carmen Patti Law Group, LLC

(57) ABSTRACT

The invention relates to a belt pulley for the output shaft of a gear being driven by an electric motor, with a support for a drive belt at the outer periphery and a receptacle for an axle in the centre, where the receptacle for the axle involves a first region, the profile of which is in such a way noncircular, that between an axle being insertable therein and the belt pulley no slip is possible, and wherein the receptacle for the axle involves a second region including at least one recess apt to allow an elastic part of the axle to snap in a form-fit way when inserted into the belt pulley through the first region. The invention further relates to a gear, to an electric motor, and to an output shaft.

18 Claims, 2 Drawing Sheets

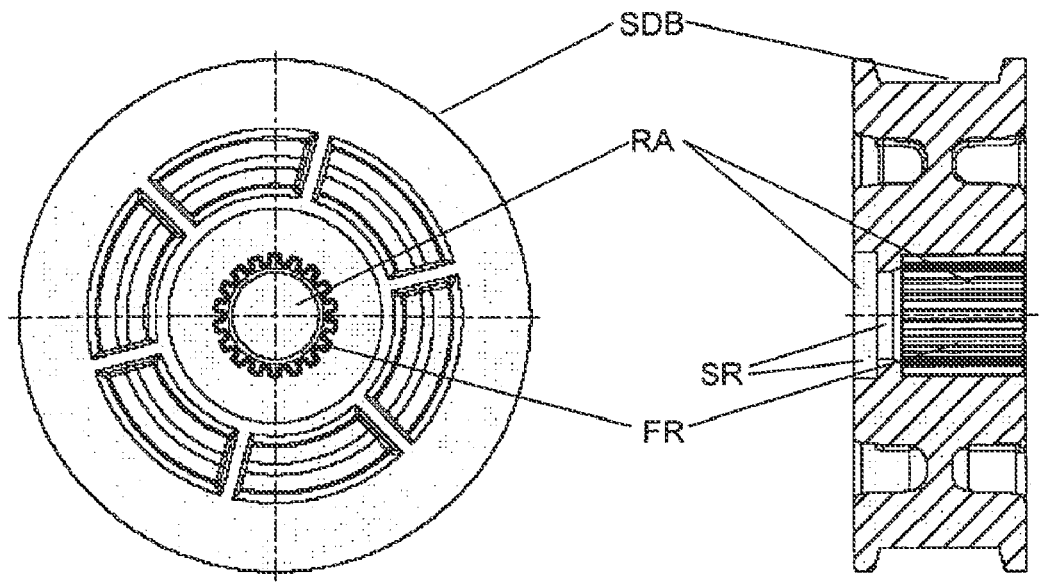
Fig. 1a  BP  Fig. 1b
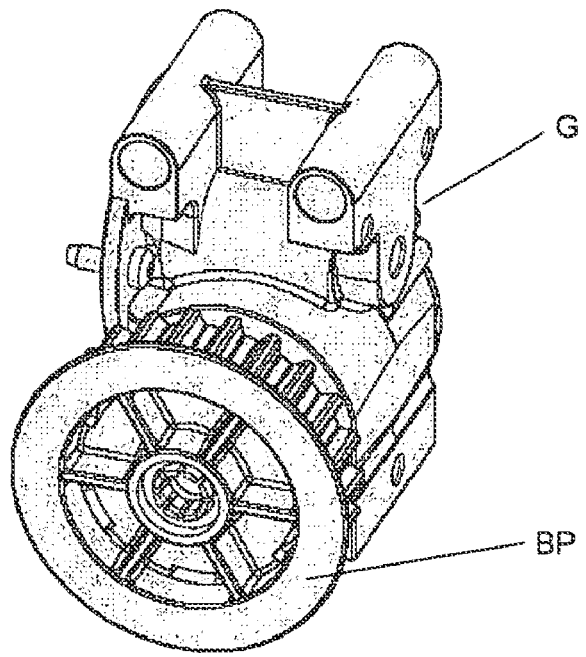
Fig. 2

BELT PULLEY FOR THE OUTPUT SHAFT OF A GEAR, GEAR, ELECTRIC MOTOR, AND OUTPUT SHAFT

TECHNICAL FIELD

The invention relates to a gear with an output shaft, for an electric motor.

BACKGROUND OF THE INVENTION

The invention is based on a priority application EP 07301020.9 which is hereby incorporated by reference.

The invention further relates to an electric motor.

Such belt pulleys and output shafts are known in the art, e.g. from GB-A-1264078 and US 202/179305 A1.

The invention was made in the field of door automation, but can be used also in other fields.

Electric motors used for door automation often use worm gears in connection with a belt drive. Normally those belts are toothed belts.

Most of possible applications are low-cost applications. But both, the worm gear and the belt drive are complex parts.

The problem to be solved therefor lies in finding a solution that can be produced in a low-cost manner.

SUMMARY OF THE INVENTION

The invention is based on the insight, that in most situations the high mechanical properties of state of the art solutions are not really necessary.

Further embodiments of the invention are to be found in the subclaims and in the following description.

BRIEF DESCRIPTION OF THE DRAWINGS

In the following the invention will be described with the aid of the enclosed drawings.

FIG. 1 shows a belt pulley according to the invention both, as front view and as cross section.

FIG. 2 shows a gear that according to the invention is provided with a belt pulley on its output shaft.

DETAILED DESCRIPTION OF THE DRAWINGS

Figure 3:
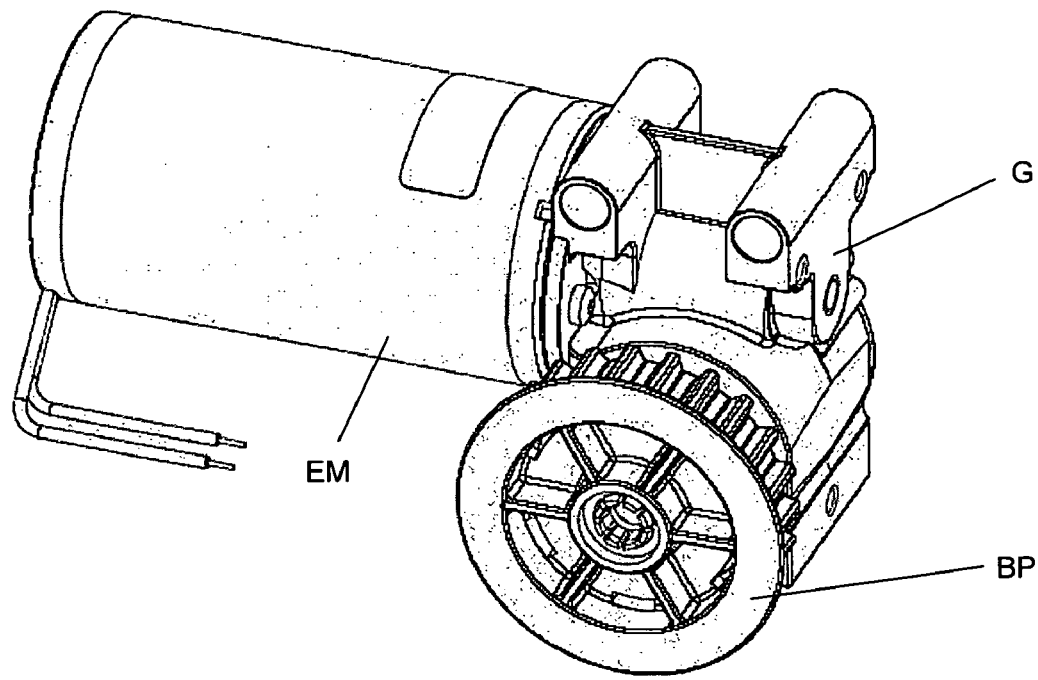
FIG. 3 shows an electric motor that according to the invention is provided with a gear that according to the invention is provided with a belt pulley on its output shaft.

The invention relates to a belt pulley for the output shaft of a gear being driven by an electric motor, with a support for a drive belt at the outer periphery and a receptacle for an axle in the center, wherein the receptacle for the axle involves a first region, the profile of which is in such a way noncircular, that between an axle being insertable therein and the belt pulley no slip is possible.

The invention further relates to an output shaft for a gear, with an area apt receive a belt pulley, in which the area apt to receive a belt pulley involves a first region on the side towards the gear, the profile of which is in such a way noncircular, that between the shaft and a belt pulley to be applied there is no slip possible, and in which the area apt to receive the belt pulley involves a second region on the side turned away from the gear involves at least elastic part apt to snap in into a recess of the belt pulley in a form-fit way.

This problem is solved according to the invention by a belt pulley for the output shaft of a gear being driven by an electric motor, with the support for a belt drive at the outer periphery and a receptacle for an axle in the centre, wherein the receptacle for the axle involves a first region, the profile of which is in such a way noncircular, that between an axle being insertable therein and the belt pulley no slip is possible, wherein the receptacle for the axle involves a second region including at least one recess apt to allow an elastic part of the axle to snap in into a form-fit way when inserted into the belt pulley through the first region, and that the recess in the second region is a circular groove open to the exterior.

The problem is further solved according to the invention by a gear with an output shaft for an electric motor, wherein the output shaft is provided with a belt pulley, with a support for a drive belt at the outer periphery and a receptacle for an axle in the centre, wherein the receptacle for the axle involves a first region, the profile of which is in such a way noncircular, that between an axle being insertable therein and the belt pulley no slip is possible, wherein the receptacle for the axle involves a second region including at least one recess apt to allow an elastic part of the axle to snap in into a form-fit way when inserted into the belt pulley through the first region, and that the recess on the second region is a circular groove open to the exterior.

This problem further us solved according to the invention by an electric motor with a gear, with an output shaft, for an electric motor, wherein the output shaft is provided with a belt pulley, with a support for a drive belt at the outer periphery and a receptacle for an axle in the centre, wherein the receptacle for the axle involves a first region, the profile of which is in such a way noncircular, that between an axle being insertable therein and the belt pulley no slip is possible, wherein the receptacle for the axle involves a second region including at least one recess apt to allow an elastic part of the axle to snap in into a form-fit way when inserted into the belt pulley through the first region, and that the recess in the second region is a circular groove open to the exterior.

This problem is further solved by an output shaft for a gear, with an area apt to receive a belt pulley, in which the area apt to receive a belt pulley involves a first region on the side towards the gear, the profile of which is in such a way noncircular, that between the shaft and a belt pulley to be applied there no slip is possible, and in which the area apt to receive the belt pulley involves a second region on the side turned away from the gear involves at least one elastic part apt to snap in into a recess of the belt pulley in a form-fit way, that is made in one piece together with an axle and a worm wheel with helical gearing forming the last gear wheel of the gear.

FIG. 1 shows a belt pulley BP according to the invention. At the left we see a front view, at the right we see a cross section.

In both views we see a support SDB for a drive belt, a receptacle RA for the axle, and a first region FR. In the cross section at the right in addition we see a second region SR.

What we do not see in this figure is the fact, that in the given example the belt pulley is a toothed one for operating together with a toothed belt. This can be seen in FIGS. 2 and 3.

The form of the belt, a toothed one, a v-belt, or a flat belt, and accordingly the form of the support SDB for the drive belt, is not of importance for the present invention. The same applies to the question whether the belt pulley guides the belt drive on both sides as in FIG. 1, on one side as in FIGS. 2 and 3, or on no side.

What matters is the design of the receptacle RA for the axle. On the one hand it has to ensure, that there is no slip between the belt pulley and an axle carrying it. And on the other hand this receptacle has to ensure that the belt pulley BP be fixed on the axle.

State of the art solutions for avoiding slip is the use of a feather key in connection with a nut in the axle. Especially when using plastic material one has the possibility of better adapting the axle to the belt pulley BP. We use polyacetal (POM), especially Delrin 100™.

Avoiding slip according to the invention is performed by a first region FR of this receptacle RA, the profile 110 of which is noncircular, and of coarse to combine it with an axle with a matching profile, when being used.

Preferably this profile 110 is a regular one like a regular polygon or a multitooth, as shown in the drawings. If necessary, of course, it could be irregular, especially in such a way, that the belt pulley and an axle only match in one position.

State of the art solutions for fixing a belt pulley on an axle is the use of a circlip in connection with a groove in the axle.

The fixing of a belt pulley on an axle according to the invention is made by using a snap fit. To this end both, the belt pulley and the axle or output shaft, are provided with a second region SR.

In the belt drive this second region SR includes at least one recess apt to allow an elastic part of the axle to snap in into a form-fit way when inserted into the belt pulley through the first region FR. Correspondingly the second region of the axle or output shaft involves at least one elastic part apt to snap in into a recess of the belt pulley in a form-fit way.

In the shown example the recess in the second region SR is a circular groove open to the exterior.

In FIG. 2 we see a gear G completed with a belt pulley BP snapped in onto its output shaft.

In FIG. 3 we see the same arrangement as in FIG. 2, now completed to an electric motor EM with gear G and belt pulley BP.

Figure 4:
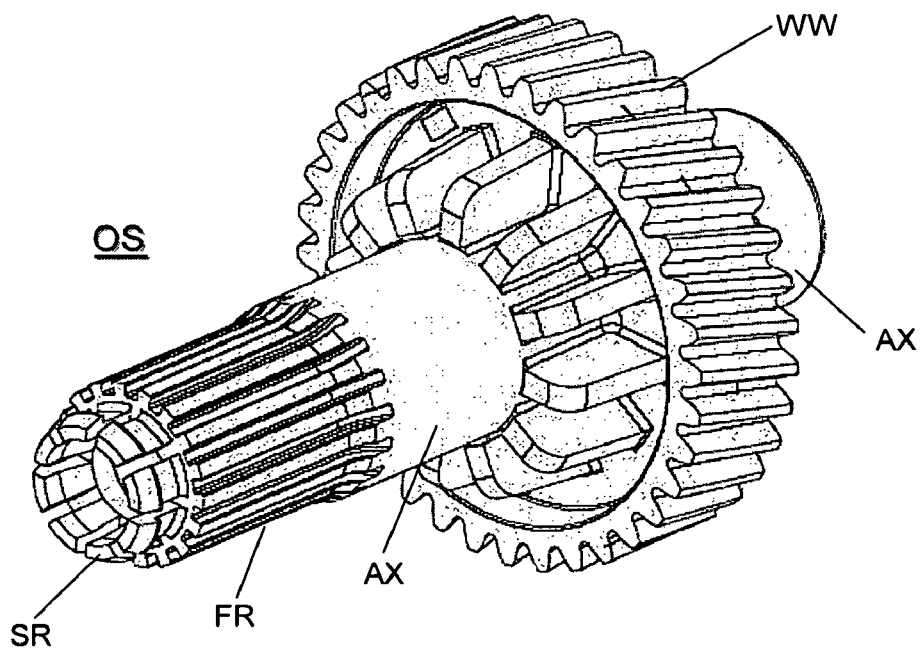
FIG. 4 shows an output shaft for a gear according to the invention, also carrying a worm wheel.

In FIG. 4 we see an output shaft according to the invention for a gear, for receiving a belt pulley.

In the given example this output shaft is made out of plastic material in one piece together with the whole axle AX and the last gear wheel of the gear, here a worm wheel WW with helical gearing. Also for this part we use polyacetal (POM), especially Delrin 100™.

The axle AX on both sides of the worm wheel WW is prepared for receiving a ball bearing each. For mechanical reasons the worm wheel is foreseen with stiffenings.

As already mentioned when describing the belt pulley the output shaft offers a first region FR and a second region SR prepared for matching with the respective first region FR and second region SR of the belt pulley. So the first region FR here shows a multitooth. The second region SR shows a number of, here 8, elastic parts, that are equal to one another and are distributed equally over the periphery. It is clear that principally either of them alone would solve the problem.

The sharp-edged implementation of both, the groove in the belt pulley BP as shown in FIG. 1, and the elastic parts of the output shaft OS as shown in FIG. 4, ensure a form-fit connection.

The invention claimed is:

1. A belt pulley and an axle of a gear being driven by an electric motor, with a support for a drive belt at the outer periphery and a receptacle for an axle in the centre, wherein the receptacle for the axle involves a first region, the profile of which is in such a way noncircular, that between an axle being inserted therein and the belt pulley no slip is possible, wherein the receptacle for the axle involves a second region comprising at least one recess wherein an elastic part of the axle to snaps in into a form-fit way when the elastic part of the axle is inserted into the belt pulley through the first region, and wherein the recess in the second region is a circular groove open to the exterior and extends to a face of the belt pulley that faces away from the electric motor.

2. The belt pulley of claim 1, wherein the electric motor is operatively connected to the gear which is operatively connected to the axle, wherein the axle is provided with the belt pulley.

3. The belt pulley of claim 1 wherein the electric motor is operatively coupled to the gear and the electric motor drives the gear which drives the axle.

4. The belt pulley according to claim 1, wherein the support for a drive belt comprises teeth for accepting a toothed belt.

5. The belt pulley according to claim 1, characterized in, that the first, noncircular region shows the profile of a regular polygon.

6. The belt pulley according to claim 1, characterized in, that the first, noncircular region shows the profile of a multitooth.

7. The belt pulley according to claim 1, wherein the second region of the belt pulley comprises a first area and a second area where second area has a diameter substantially the same as the diameter of the first region of the belt pulley and the first area has a diameter smaller than the diameter of the second area, wherein the second area extends to face of the belt pulley facing away from the electric motor.

8. The belt-pulley according to claim 1, wherein the first region comprises a multi-tooth pattern that extends up to the second region but which stops at the second region.

9. The belt pulley according to claim 7, wherein the second area comprises the recess.

10. An output shaft of a gear, that receives a belt pulley, wherein an area of the output shaft that receives the belt pulley comprises a multi-tooth first region on a side towards the gear, the profile of which is in such a way noncircular, that between the shaft and the belt pulley there no slip is possible, and in which the area that receives the belt pulley involves a second region on a side turned away from the gear involving at least one elastic part that snaps in into a recess of the belt pulley in a form-fit way, wherein when the at least one elastic part is snapped into the belt pulley a portion of the at least one elastic part extends to an exterior face of the belt pulley where the exterior face faces away from the gear, wherein the second region of the output shaft comprises a first area forming a first circular groove around the output shaft and a second area forming a second circular groove around the output shaft, where the first area has a diameter smaller than a diameter of the second area, and the circular grove of the second area steps down from the first region and the circular groove of the first area steps up to the groove of the second area.

11. The output shaft of claim 10 wherein the second region of the output shaft passes completely through a first region of the belt pulley when the output shaft is snapped into the recess of the belt pulley in a form fit way so that the second region of the output shaft ensures that the belt pulley remains fixed to the output shaft.

12. The output shaft of claim 10 that is made in one piece together with an axle and a worm wheel with helical gearing forming the last gear wheel of the gear.

13. The output shaft of claim 10 wherein the second region of the output shaft passes completely through a first region of the belt pulley such that no portion of the second region of the output shaft remains in the first region of the belt pulley when the output shaft is snapped into the recess of the belt pulley.

14. The output shaft according to claim 10, wherein the second region of the output shaft comprises a first area and a second area where the first area has a diameter smaller than a diameter of the second area, and the first area is closer to the electric motor than the second area.

15. The output shaft according to claim 10, wherein the first, noncircular region shows the profile of a regular polygon.

16. The output shaft according to claim 10, wherein the first, noncircular region shows the profile of a multitooth.

17. The output shaft according to claim 10, wherein the second region shows a number of elastic parts, that are equal to one another and are distributed equally over the periphery.

18. The output shaft according to claim 14, wherein the second area snaps into the recess of the belt pulley.

* * * * *